United States Patent [19]

Bush et al.

[11] Patent Number: 4,937,087
[45] Date of Patent: Jun. 26, 1990

[54] METHOD OF MANUFACTURING MICROWAVABLE FARINA

[75] Inventors: Deidre J. Bush, Park Ridge; Marvin K. Lenz, Algonquin, both of Ill.

[73] Assignee: The Quaker Oats Company, Chicago, Ill.

[21] Appl. No.: 355,928

[22] Filed: May 23, 1989

[51] Int. Cl.$^5$ ............................................. A21D 6/00
[52] U.S. Cl. .................................... 426/465; 426/523; 426/622
[58] Field of Search ............... 426/465, 520, 619, 620, 426/622, 523

[56] References Cited

U.S. PATENT DOCUMENTS

| | | | |
|---|---|---|---|
| 2,890,117 | 6/1959 | Cantor | 426/619 |
| 3,526,513 | 9/1970 | Hyldon | 426/619 |
| 4,590,088 | 5/1986 | Karwowski | 426/621 |

*Primary Examiner*—George Yeung
*Attorney, Agent, or Firm*—Joseph P. O'Halloran; Daniel P. Latham; Mart C. Matthews

[57] ABSTRACT

A method for the manufacture of a microwavable Farina is disclosed. The preferred method involves high temperature (300–600 Degrees F.), short time (30–180 seconds) heating of relatively dry farina (20% or less moisture, preferably 14.5% or less moisture) in direct contact with hot air, to achieve at least partial (10%+) gelatinization. The resulting product can be consumer prepared in a one-step microwave method without lumping.

4 Claims, 3 Drawing Sheets

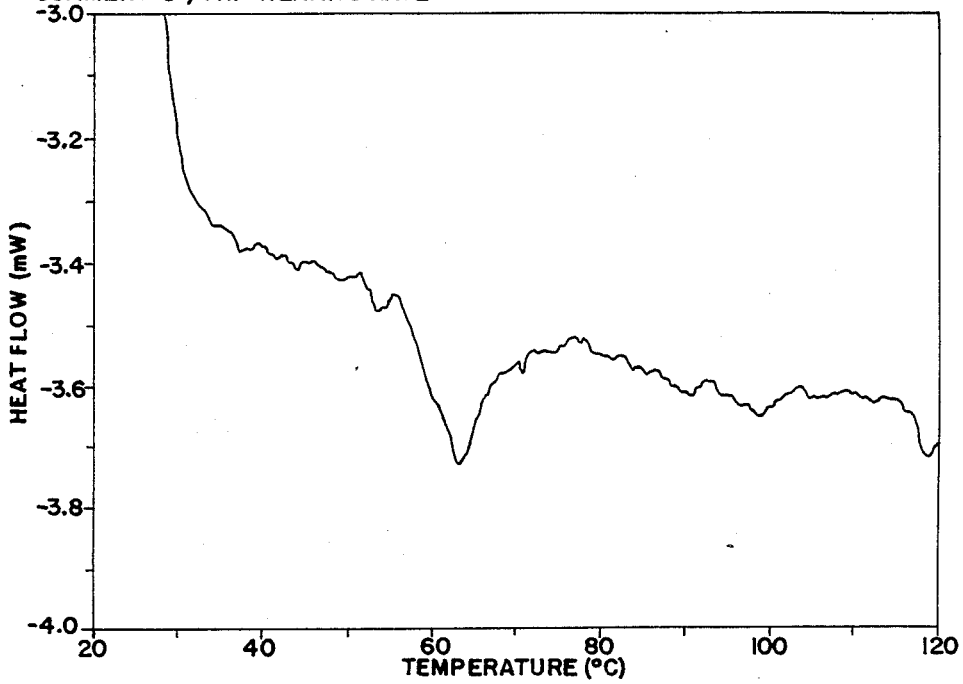
FIG_5
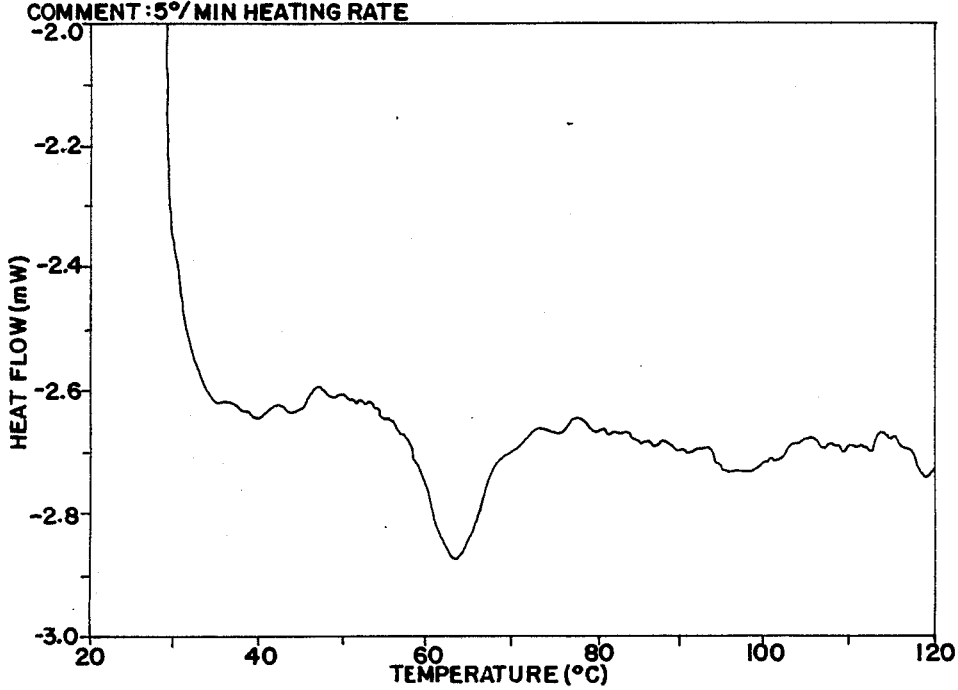
FIG_6

METHOD OF MANUFACTURING MICROWAVABLE FARINA

TECHNICAL FIELD

This invention relates to the consumer preparation of a farina which is non-lumping when cooked as a hot cereal by the consumer in a one-step microwave method. The farina is preferably manufactured in a high temperature, short time, low moisture air heat-treatment step for at least partial pregelatinization.

BACKGROUND OF THE INVENTION

When the previously available farina products are prepared on a stove top, they do make a non-lumpy product having an acceptable texture, i.e. a slightly granular, non-lumpy character. However, when microwave consumer preparation is attempted, the presently available farina products tend to generate extremes of texture—much of the cereal product in the bowl becomes lumpy, and the rest of the bowl content becomes watery. The lumpy portion of the farina mixture is believed to be the result of uneven hydration during microwave preparation. It is clear that some parts of the cereal in the bowl tend to be vastly underhydrated, and other parts tend to be over hydrated.

The only known way to avoid this problem with such products during microwave cooking is to interrupt the cooking cycle part way thru the cooking cycle and stir the product mixture. This is an example of the so-called two step method. In fact, any microwave method which involves an interruption of the microwave cooking cycle, for example, for the purpose of manipulating the cooking vessel or its contents, and resumption of the cooking cycle, is referred to generally, and herein, as a "two step" method.

With the meteoric increase in the use and availability of microwave ovens, the microwave method of consumer preparation of hot cereals has also become increasingly popular. Parents are believed to be increasingly likely to encourage their children to prepare a personal serving bowl of hot oat cereal in the microwave. Hence, it would be desirable to provide improvements in farina processing which would result in a farina cereal product which can be consumer prepared in a one step microwave method which is not particularly sensitive to reproduction of exact conditions. The preferred consumer preparation method would also not involve interruption and resumption of the microwave cooking cycle nor stirring of the cereal/water mixture at some point during the cooking step in order for the consumer to achieve successful preparation of the farina in the microwave.

Microwave foaming and foamover is normally not encountered with farina products, and hence, for this reason also, farina would be an ideal candidate for consumer microwave preparation.

Hence, it would be desirable to provide a farina product which does not encounter the lumping problem when used in the one-step microwave method.

It would also be desirable to provide a method for the manufacture of such a farina, which method does not require the use of steam in order to achieve gelatinization of the product.

It is an object of the present invention to provide a farina product which evenly hydrates in a one step method in a microwave oven, and which can be prepared by the consumer, with complete and uniform rehydration, in such a one-step microwave preparation method.

It is also an object of the present invention to provide a farina which is microwavable with no stirring required during cooking, having a texture which, after the microwave cook, is like the longer-cooking, regular farina when cooked.

SUMMARY OF THE INVENTION

This invention provides for at least partially cooking farina to the extent that from 10% to 100% of the starch is gelatinized, then drying, packaging and distributing the resulting product. This product is ready for convenient, reliable consumer preparation of the farina as a hot cereal in a microwave oven, if desired as a single serving, in a one step method. The invention results in an even, consistent texture hot cereal thusly prepared by the consumer.

This invention also provides a novel manufacturing method for pregelatinizing the farina in order to produce the farina preferred for use in the microwave. In accordance with this novel manufacturing method the farina is pregelatinized to between 10 and 75% gelatinization. Such farina which is the product of this novel manufacturing method is a preferred farina for one-step microwave preparation by the consumer. However, farina which is completely gelatinized, for example, by steaming methods and farinas pregelatinized by other methods, are also eminently satisfactory for use in accordance with the broad aspects of the microwave consumer-preparation method of this invention.

The starting material, or charge, of the novel manufacturing method of this invention is regular Farina (e.g. Cream of Wheat). Although there is a current Federal Standard defining "Farina", (which Standard is incorporated herein in its entirety by reference thereto) the Farina starting material of this invention is typically, and preferably, a 20+40 Mesh (U.S. Standard) material.

The novel manufacturing method may be characterized as a high temperature, short time, low moisture method. The starting moisture levels of the farina used in the manufacturing heat treatment step of this invention is relatively low, i.e. at or below 20% moisture. In preferred embodiments, the moisture level of the charge has ranged between about 11% and 14.5%, usually about 11-12%, inclusive. However, the process of this invention works well, also, with charges of farina having initial moisture levels in the range of 14.5-20%. Nonetheless, the farina is preferably charged to the cooker with no pre-treating, tempering, or other conditioning. This starting material Farina is completely ungelatinized, ordinarily.

In accordance with the present invention, such relatively dry farina is treated with high temperature dry air for a short period of time sufficient to gelatinize the starch in the farina at least to a level of 10% gelatinization. This is achieved, for example, when starting with a charge having an initial moisture in the 11–14.5% range, by heating with 500 degree F. air for sufficient time to drop the moisture content of the treated material to between 4 and 10%, preferably between about 6 and 10%, and more preferably between about 7 and 9% inclusive, said period of time being sufficient to accomplish at least 10% gelatinization.

The hot air temperatures which are used in accordance with the novel method of this invention are preferably between 300 and 600 degrees F., inclusive, and the heat treatment times, selected in accordance with the desired degree of cook and level of drying, are preferably in the range of between 30 and 180 seconds, inclusive. The farina is preferably treated, in accordance with the novel method of this invention, in a dry, fluidized bed, which is continuously replenished in, and continuously discharged from, the cooker.

In an illustrative embodiment, charged material at a moisture level between 11 and 14.5% is cooked in a fluidized bed in a Jetzone (TM) toasting oven at 500 Deg.F. for 45 sec. with air velocity of 100-1000 fpm. The final moisture content of that farina out of the Jetzone cooker is between about 4-10%, most preferably between 7-9%, inclusive.

The resulting product has a desirable slightly toasted flavor. It is eminently satisfactory and useful for packaging and for use in the normal trade distribution channels, and for use eventually in a one-step microwave preparation by the consumer. Upon one-step microwave preparation by the consumer, the product of this invention has an even, consistent texture similar to that of traditional longer-cooking stove top farina.

THE DRAWINGS

By way of summary, a number of the drawings consist of plots prepared by Differential Scanning Calorimetry, DSC. FIG. 1 represents a DSC curve of a farina product which is not prepared in accordance with this invention, and is provided for comparison purposes only. FIG. 2 is a DSC plot obtained using a completely gelatinized wheat sample. FIG. 3 is a plot which illustrates how DSC can be used in determining % gelatinization of any farina product. The rest of the figures represent DSC curves of farina product which is prepared in accordance with this invention.
Specifically:

FIG. 5 is a DSC curve prepared using farina which is manufactured in accordance with this invention, using low air velocity, and temperature of 500 degrees F. and a residence of 45 seconds.

FIG. 6 is a DSC curve prepared using a sample of farina manufactured in accordance with this invention, in a method using low air velocity, and a temperature of 500 degrees F., and a residence time of 75 seconds.

DISCUSSION OF THE DSC PLOTS, GENERALLY

Figure 1:
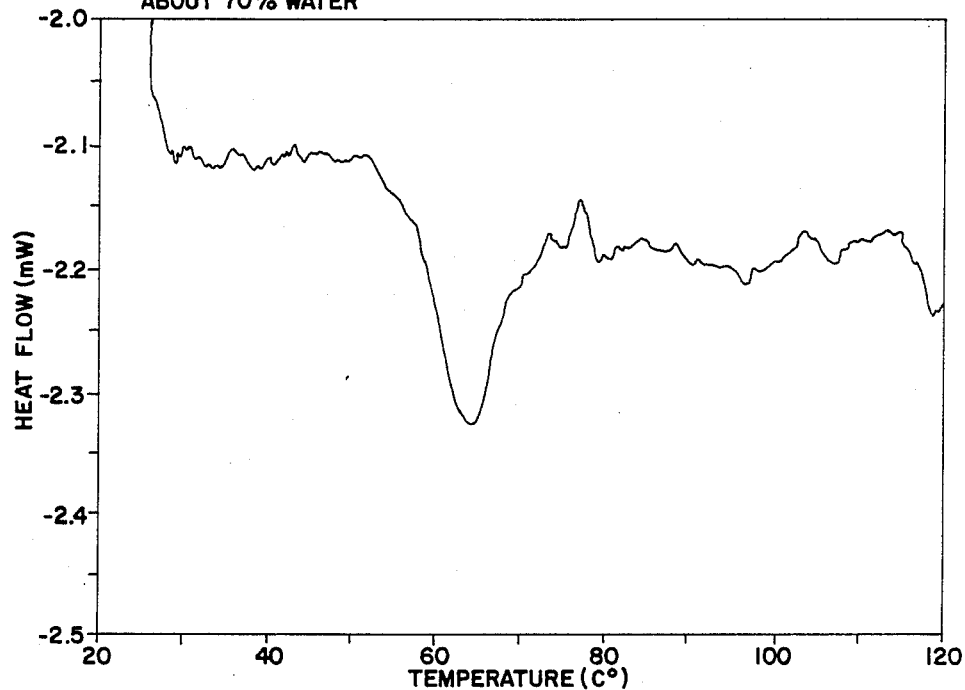
FIG. 1 is a DSC curve prepared when presently available commercially available Nabisco (TM) Farina (which our tests indicated was completely ungelatinized.) is used as the test sample.

Although not presently an official method, to our knowledge, the Differential Scanning Calorimetry, DSC, procedures for determining the degree of gelatinization are well known, commonly used procedures. Hence, there are no official DSC methods for this designated by the AACC (American Assoc. of Cereal Chemists), AOAC (Association of Official Analytical Chemists), and ASTM (American Society for Testing Materials). Nonetheless, today, the DSC methods are used in studying the cooking and gelatinization processes, thruout the world. For example, see DIFFERENTIAL SCANNING CALORIMETRY STUDY OF THE WHEAT GRAIN COOKING PROCESS, by T. Jankowski, Poznan (Poland) and C. K. Rha, Cambridge (U.S.A.). published in Starch/Starke 38, (1986) Nr. 2, S. 45-48, which is incorporated herein, in its entirety, by reference thereto.

For the data set forth in this patent application, the inventors utilized a DuPont Instruments 9000 Thermal Analyzer, and the Module 910 (T.M. Du Pont). The entire analytical procedure is set forth in the Operator's Manual, (Pn 910037-002 Rev. A. Issued January '85), for the 9000/9900 Thermal Analyzer (TM, DuPont), of the DuPont Instruments Thermal Analysis System (TM, DuPont). The procedure is described in detail at page 50, et.seq. The procedures set forth are incorporated herein in their entirety, by reference thereto. Again, this further illustrates the widespread availability of procedures for the use of such DSC equipment and methods, and, of course, systems and instruments provided by other reputable manufacturers are eminently satisfactory for use in determining the degree of gelatinization of grains for the purpose of monitoring processes, to determine whether the particular process is, or is not, in accordance with this invention.

It should be noted that in the case of the above mentioned instruments employed by applicants hereto, the plot is displaced downwardly below the curve base line, during gelatinization. Hence, in this specification, reference is made to the area "under the curve base line." In some other, equally satisfactory instruments, the components are arranged so that the plot is displaced upwardly during the gelatinization of the sample. In the latter case, it would be appropriate to refer to the corresponding area "above the curve base line."

It may also be useful to at least briefly discuss the DSC procedure. A small measured amount (i.e. a micro amount, usually a matter of milligrams) of grain-water mixture at a ration of about 1 part grain to 2 parts water, is hermetically sealed into a small metal pan. The sealed sample pan, and an empty sealed pan are placed side by side in a DSC instrument which determines the rate at which heat is absorbed by each of the pans. The temperature of the environment within which the pans are placed is controlled to rise at 5 Degrees Centigrade per minute, and is raised, during the test, from ambient temperatures to 120 Degrees C.

When test samples of raw cereals are subjected to the DSC test procedure, they absorb heat, and the amount of heat absorbed is a function of many possible variables. For example, it is a function of the specific heat of the contents of the pan, and simply raising the temperature of the contents of the pan involves the "consumption" of some heat. Moreover, the starch-water mixture will begin to absorb additional heat when the gelatinization temperature is reached, and this heat is believed to be "used up" in connection with the gelatinization of the starch in the sample. If the test sample is completely ungelatinized at the start of the test, sufficient "extra" heat will be absorbed for the sample to become completely gelatinized. If the test sample is already completely gelatinized, no "extra" heat will be consumed, as the temperature of the environment moves up thru the gelatinization temperature range, since no further gelatinization will occur during the test procedure. Any "use" or loss of heat during the DSC test procedure causes a "dip" in the curve being tracked, or plotted. The area of the "dip" under the DSC curve is directly proportional to the amount of extra heat, or to the amount of "lost heat", associated with the gelatinization that occurs, and hence, is inversely proportional to the extent of gelatinization of the starting sample. For example, a "raw" farina sample absorbs a relatively large amount of heat, during the test procedure as it is cooked in the instrument, and hence its DSC curve shows a relatively large dip. A test sample which is completely gelatinized at the onset, will absorb no additional heat in connection with further gelatinization during the DSC test procedure, and the area under the curve will be substantially zero, indicating complete gelatinization of the sample at the onset.

Specifically, if there is substantially no gelatinization of the starch in the test sample, initially, as in the case of the competitive Nabisco quick, long cooking farina product tested to provide FIG. 1, the area under the differential scanning calorimeter curve base line is about 9.35. square centimeters, which converts to 3.42 square centimeters per milligram of dry sample. (The fact that there was no gelatinization in this particular sample was also verified using standard polarization microscopy techniques, to evaluate the proportion of Maltese crosses.

Figure 3:
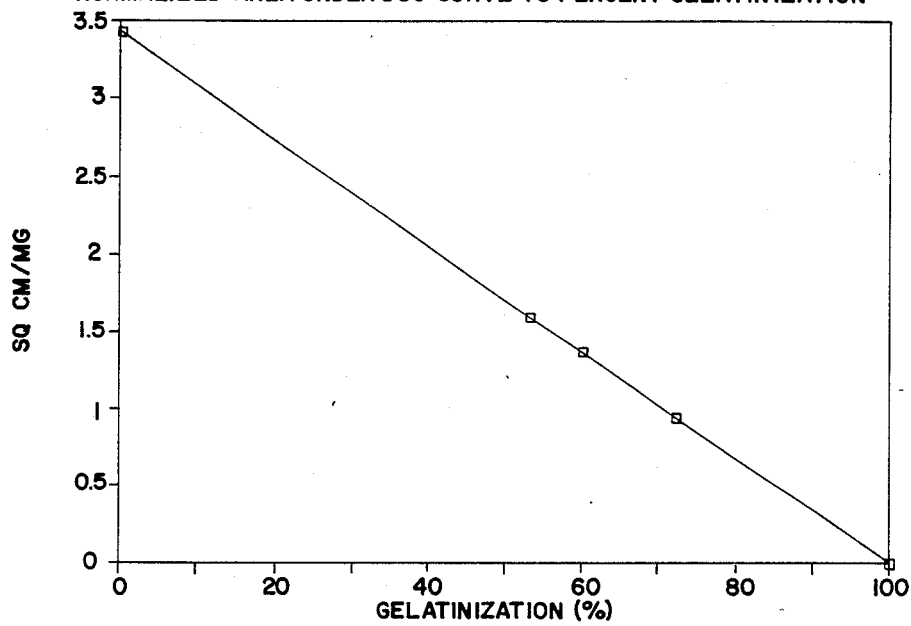
FIG. 3 is a plot of "normalized" areas under the curve, (i.e. the area under the curve expressed in square centimeters per milligram of dry sample,) against the % gelatinization.

On the other hand, if you have an initial test sample in which complete gelatinization has already taken place, one finds 0 square centimeters under the DSC test curve base line. If these numbers were to be plotted on a graph, as in FIG. 3, attached, the resulting graph would be useful in determining the degree of gelatinization, since, as defined by the FIG. 3 plot line, the "normalized" area under the curve is inversely proportional to the degree of gelatinization. This process is further illustrated in the following examples.

The DSC curves which constitute the drawings will also be referred to hereinafter in connection with the specific materials they represent, during the course of the following discussion of the results of the illustrative examples. These will show preparation of farinas in accordance with this invention, and provide comparisons with farinas prepared not in accordance with this invention.

EXAMPLES

In the following examples, all percents (%) are in percent by weight, based on the weight of the material then being referred to, and all temperatures are in degrees Fahrenheit, unless otherwise referred to. All parts are in parts by weight.

EXAMPLE 1

The DSC curve of a raw farina "control" sample, used for comparison purposes in Example 2 herein, was determined, and is presented herein as FIG. 1 in the attached drawings. This curve exemplifies the DSC curve of a test farina sample product which is substantially uncooked.

Figure 2:
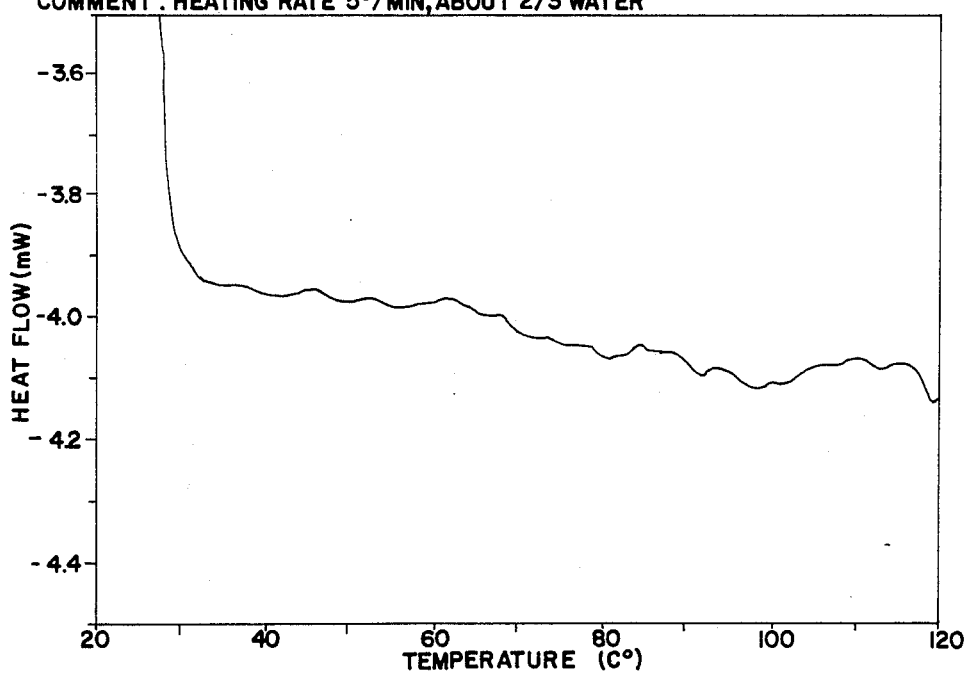
FIG. 2 is a DSC curve prepared using completely precooked Durum wheat as the sample.

For comparison purposes, also, the DSC curve of completely cooked farina was prepared and is shown in FIG. 2. It is noted that there is no "dip" in the plot under the base line as the completely cooked material passes thru the gelatinization temperature.

Additional test samples having varying degrees of gelatinization were also evaluated using the DSC procedure, and the data of these tests, along with the results of the two tests referred to immediately above are the basis of the curve of FIG. 3, attached. In each of these tests, the data representing the area under the curve base line is converted to a "normalized basis," that is to the basis of a single "standard" test sample, e.g. to the basis of a 0.1 mg sample. The normalized data is then plotted, as in FIG. 3, attached. A resulting plot is obtained which itself is useful in the analytical procedure referred to herein as the DSC method for determining the extent of gelatinization of other test samples.

EXAMPLE 2

In each of a series of test manufacturing procedures, in accordance with this invention, farina (−20+40 Mesh) is continuously charged to a dry fluidized bed of farina in a heat treatment vessel under thru-put conditions in which the respective residence times of the farina in the vessel, as set forth in Table 1, are achieved. The residence time is calculated on the basis of the input rate, and the approximate amount of farina in the fluidized bed in the vessel. The bed of farina is maintained in the fluidized condition by the passage of a stream of high temperature air thru the vessel, and thru the bed. The air velocity is adjusted for respective tests, as set forth in Table 1. In each of the tests of this series, the high temperature air is maintained at 500 degrees F. The products of the respective process conditions were analyzed for degree of gelatinization using the DSC method, and the results of the tests are reported in respective Figures, attached, and summarized in Table 1.

TABLE 1

Figure 4:
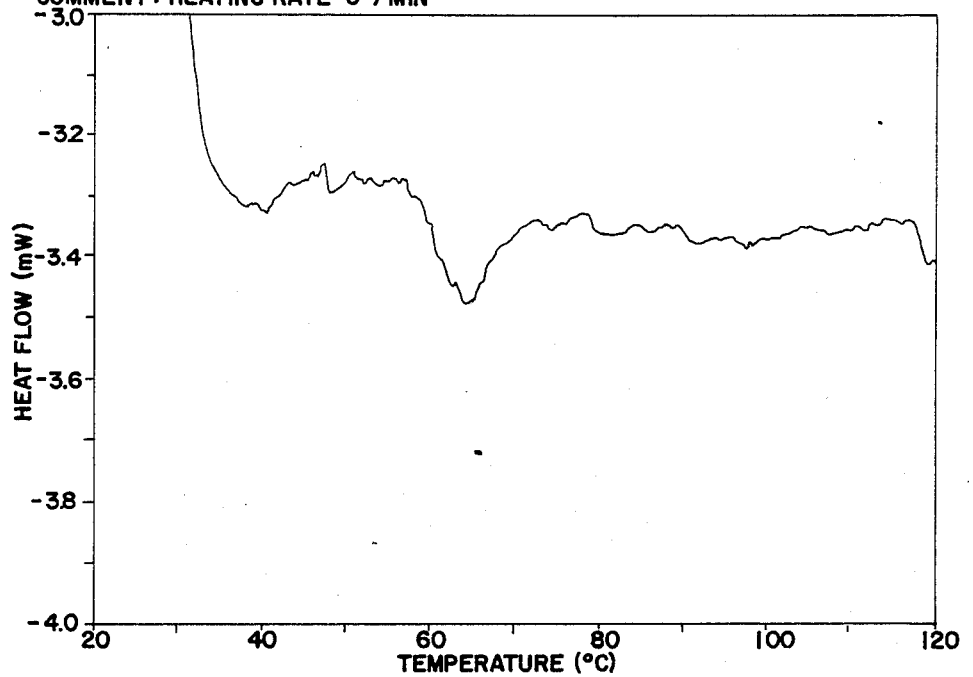
FIG. 4 is a DSC curve prepared using farina which is manufactured in accordance with the invention, using high velocity air, at a temperature of 500 degrees F. and a residence time of 45 seconds. This product is a product of the present invention.

| Test No. | Air Veloc. | Temp. Degr. F. | Resid. Time | DSC FIG. | % Gelat. |
|---|---|---|---|---|---|
| 1. | HIGH | 500 | 45 SEC | FIG. 4 | 72 |
| 2. | LOW | 500 | 45 SEC | FIG. 5 | 53 |
| 3. | LOW | 500 | 75 SEC | FIG. 7 | 60 |

In each of these tests, the moisture content of the farina after the high temperature dry air cooking step was in the range of 4–10%, and the product was at least partially gelatinized. Each of these products were storage stable, and each gave an evenly textured consumer-prepared farina cereal, free of lumps when cooked in a microwave one-step preparation method.

For comparison purposes only, the ungelatinized farina starting material referred to above in connection with Example 1, corresponding to the farina of present commerce, upon attempted one-step preparation in a microwave, using an identically same microwave procedure, gave a mixture which was both lumpy and watery.

EXEMPLARY DIRECTIONS FOR ONE-STEP MICROWAVE COOKING OF PRODUCT

A one step microwave procedure for consumer preparation, which is referred to thruout this document, simply involves admixing the farina and water, and heating the mixture in a vessel in a microwave oven, without any interruption and resumption of the microwave heating cycle. A preferred one step method, and specifically the method as used in this Example 2, is set forth immediately below.

Stir ¾ cup water into 1 ounce of farina in a serving vessel, and subject to microwave cooking for 2 minutes.

Toward the end of the microwave time, the water is visibly boiling. In spite of the relatively long microwave cook time, there is no foam-over. We believe the product is completely gelatinized by the end of the the two minutes in the microwave (Alternatively, the water can be brought to a boil, and then the product of this invention added to it. The microwave cooking time after that should be about 1-1.5 minutes. However, this procedure, and any procedure involving interruption and resumption of the microwave cooking cycle, for example, for further manipulation of the cooking vessel or its contents, is referred to generally, and herein, as a "two step" microwave method.)

ADDITIONAL DISCUSSION OF ONE STEP MICROWAVE METHOD

Of course, other variations on the two illustrative one-step microwave cooking methods are eminently satisfactory for use in consumer preparation of the product of this invention. For example, we performed the consumer preparation step, using product made in accordance with this invention, using tap water at temperatures thruout the entire range of temperatures normally available in U.S. homes, namely, at initial water temperatures in the range of from about 60 to 150 degrees F. With the lower starting temperature water tests, the times for preparation of a single serving sample (one ounce) and using ⅔ cup water, we found that about 2 minutes microwave heating was sufficient for complete cooking and flavor development. In tests using higher starting-temperature water, we found that the microwave times for preparation of similar single serving samples could be reduced to the 1 to 1½ minute range.

The foamover problem referred to above is not encountered during the microwave consumer preparation of farina. It should be noted, however, that after the microwave heating is continued long enough for the gelatinization of the starch in the farina to be substantially complete, continued microwave heating would tend to cause steam pockets to form in the cereal. These pockets would erupt at the surface of the cooked cereal, but this phenomenum is not associated with what is referred to as "foamover". We prefer to adjust the microwave cooking times to avoid the post-cooking steam pocket eruption phase, or to involve a minimal period of time in which the post cooking steam pocket eruption in involved. Extending the microwave cooking times into the post cooking steam-pocket eruption phase unnecessarily incurs the risk of needlessly spattering the cereal within the microwave oven.

EXAMPLE 3

We have also run Jetzone cooks in accordance with this invention, on pre-tempered farina. Using the procedure of Example 2, the tests of this example were carried out using feed starting material with moisture levels higher than the 11-12% range referred to above in connection with Example 2. We have noted in the latter tests, as in tests involving similar Jetzone cooks with other, similar grains, however, that when the higher feed moisture levels are used, it requires slightly longer cook, i.e. residence times in the fluidized bed. In this case it required, for example, an additional 15-30 seconds of treatment in the fluidized bed using 500 Degrees F. air, to provide the same degree of gelatinization in the final product. For example, at 11-12 % moisture requires 45-60 seconds, whereas starting with slightly tempered farina at 18-20% moisture requires 60-75 seconds at 500 Degrees F., in order to reach comparable degree of gelatinization.

Hence, with the use of feed materials with higher moisture contents, we have observed slightly slower temperature rises, as compared to testing, under otherwise identical conditions, of material with slightly lower moisture levels.

COMPARISON OF PRODUCT IN MICROWAVE COOKS

The product of this invention does not need to be stirred while being microwave cooked, and yet after being microwave cooked in a one step method, as set forth above, produces a product similar to regular long cooking cooked farina. On the other hand, presently available straight farina needs to be stirred from time to time if cooked in the microwave, or lumpy, watery cereal results.

In comparable cooks in a microwave oven, the 10-25% pregelatinization farina products in accordance with this invention, gave results which were comparable in texture to 60-70% gelatinization products in accordance with this invention. None required stirring while being cooked in the microwave oven. However, in products made in accordance with the preferred fluidized bed method of this invention, and which were processed to provide gelatinization levels above 70%, experts were able to detect the beginnings of a "burnt" flavor note. At levels between 70 and 80%, the "burnt" flavor note is not so strong as to make the product unacceptable, however.

DISCUSSION

After the high temperature dry cooking step in accordance with the preferred procedure of this invention, it is determined that between 10-75% gelatinization has been accomplished when preferred conditions are employed in the heat treatment step. As indicated above, the degree of gelatinization is determined by observation of the Maltese crosses, and by observation of the areas under the DSC (Differential Scanning Calorimetry) curves using the normalized area data in connection with the plot of FIG. 3.

Products in accordance with preferred embodiments of the present invention produce tracks with dips having only 3.78-5.25 square centimeters area under the DSC track, which translates to 0.95 to 1.64 square centimeters per milligram of dry sample. These "normalized" numbers relate to approximately 70% gelatinization and 50% gelatinization, respectively.

In order to evaluate the effect of higher levels of gelatinization, we also made longer time treatment Jetzone fluidized bed runs to achieve up to about 80% gelatinization. At this level we got some burning of the product in the Jetzone cooker, and hence, for higher levels of gelatinization, we went to the boiling trials. In the latter trials, we made alternative product by boiling wheat farina in water, and then milling it out to get a product which is like farina, physically speaking, but which had 100% gelatinization. The latter, completely gelatinized product, gave eminently satisfactory farina, when prepared in a one-step microwave consumer-preparation method.

We have also extracted the fat from the farina after Jetzone cooking in accordance with preferred embodiments of this invention and subjected the extracted fat to differential scanning calorimeter testing for oxidative reactions. It was found that the resulting extracted fat is equal to or more stable than the fat in regular, presently available farina. We have not re-added moisture to the Jetzonetreated farina to bring it back to the 11–12% moisture. There is no evidence that it would be necessary to do so, in order to obtain a storage-stable product. Nonetheless, one could adjust the moisture level of the Jetzone-cooked product of this invention upwards to these more conventional levels, if desired.

Note that farina has 0.4–0.5% fat, whereas oats has 7–8% fat.

We claim:

1. The method of manufacturing farina which is suitable for one-step microwave preparation by the consumer, said method comprising the step of subjecting raw farina to a high temperature, short time cooking step in direct contact with air, wherein the air is at a temperature in the range of 300–600 Degrees F., inclusive, and the time is sufficient to gelatinize the starch in the farina to between about 10% and 80% gelatinization inclusive.

2. The method of manufacturing farina which is suitable for one-step microwave preparation by the consumer, said method comprising the step of subjecting raw farina having an initial moisture content in the range of about 11–14.5%, inclusive, to a high temperature, short time cooking step in direct contact with air, wherein the air is at a temperature in the range of 300–600 Degrees F., inclusive, and the time of said contact is sufficient to lower the moisture to between about 4–10%, inclusive.

3. The method of manufacturing farina which is suitable for one-step microwave preparation by the consumer, said method comprising the step of subjecting raw farina having an initial moisture content in the range of from about 14.5% to 20%, inclusive, to a high temperature, short time cooking step in direct contact with air, wherein the air is at a temperature in the range of 300–600 Degrees F., inclusive, and the time of said contact is sufficient to lower the moisture to between about 8–16%, inclusive.

4. The method of claim 2 in which said time is in the range of from about 30–180 seconds, inclusive.

* * * * *